Nov. 30, 1937.   A. N. SPÁNEL   2,100,574
FORM FOR MAKING POUCHES
Filed Aug. 31, 1934   3 Sheets-Sheet 1
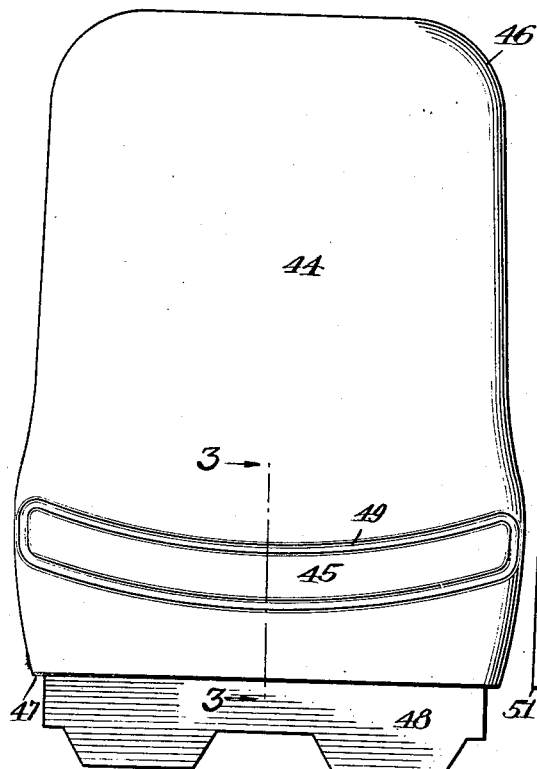
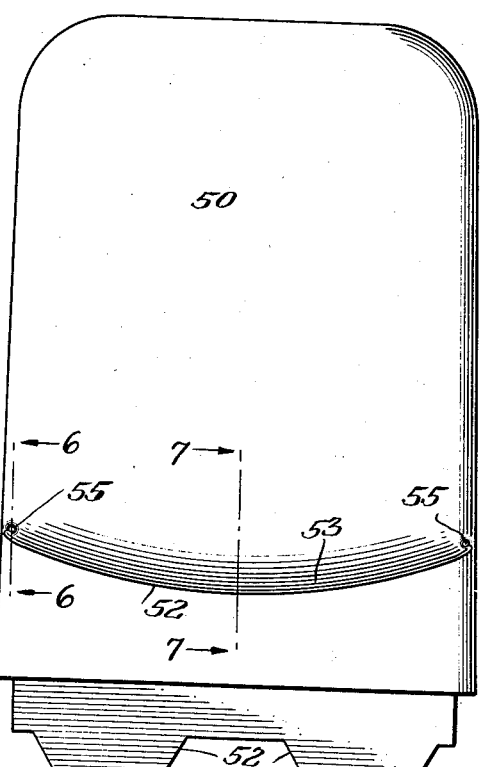
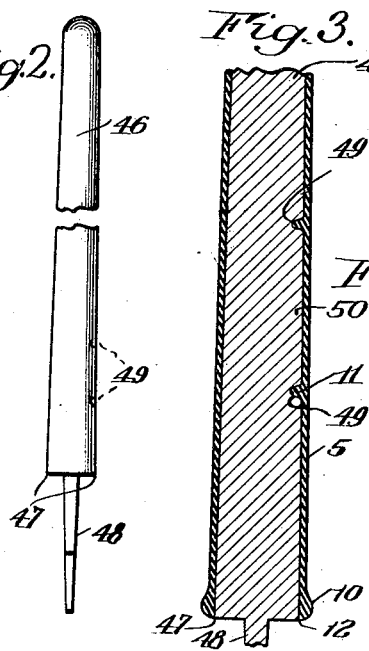
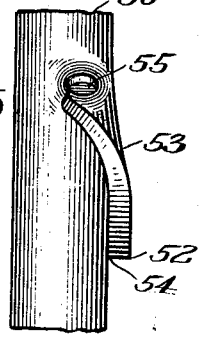
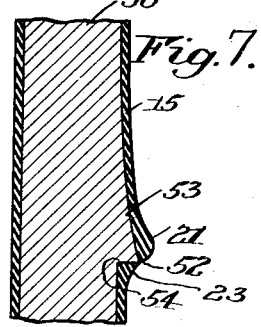
INVENTOR
Abraham N. Spánel
BY D. Clyde Jones
his ATTORNEY Nov. 30, 1937.  A. N. SPÁNEL  2,100,574
FORM FOR MAKING POUCHES
Filed Aug. 31, 1934   3 Sheets-Sheet 2
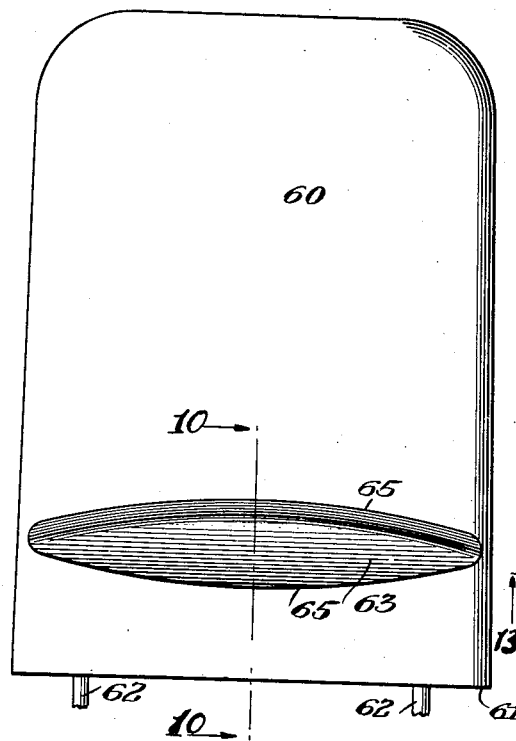
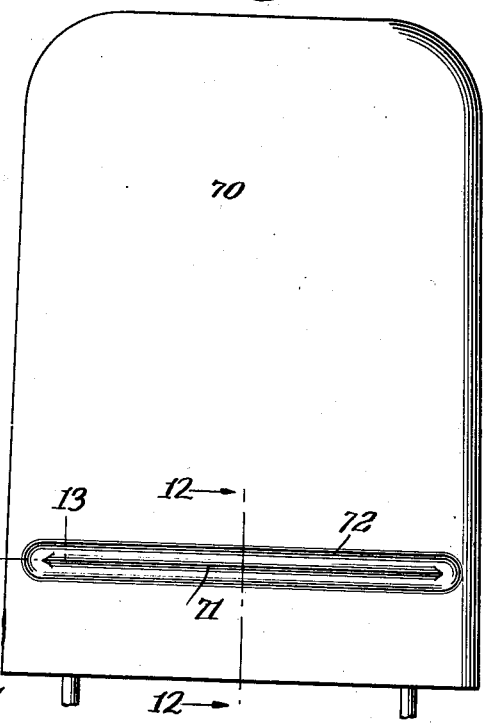
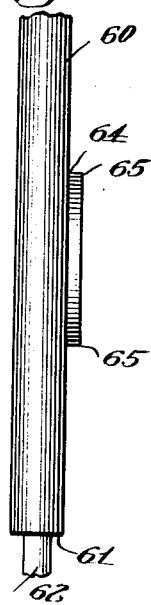
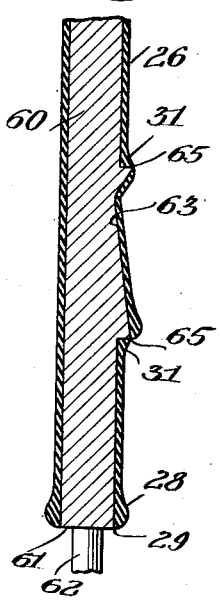
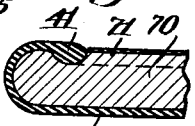
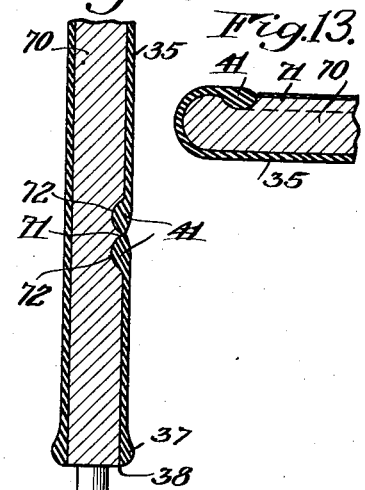
INVENTOR
Abraham N. Spánel
BY D. Clyde Jones
his ATTORNEY Nov. 30, 1937.  A. N. SPÁNEL  2,100,574
FORM FOR MAKING POUCHES
Filed Aug. 31, 1934  3 Sheets-Sheet 3
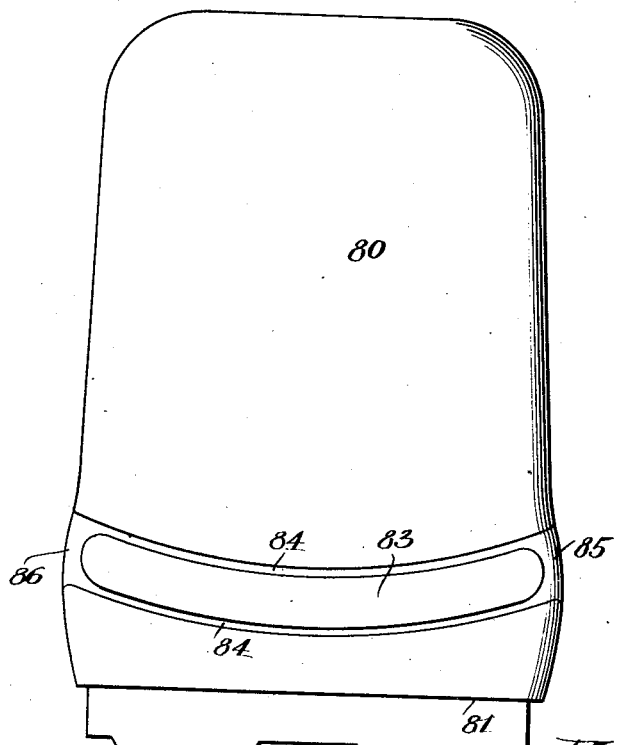
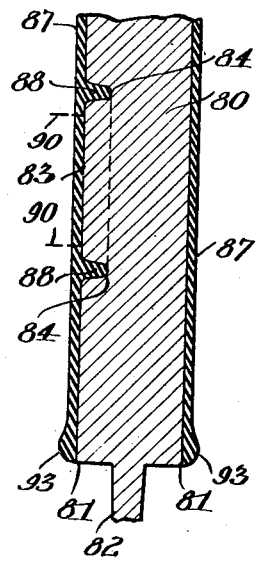
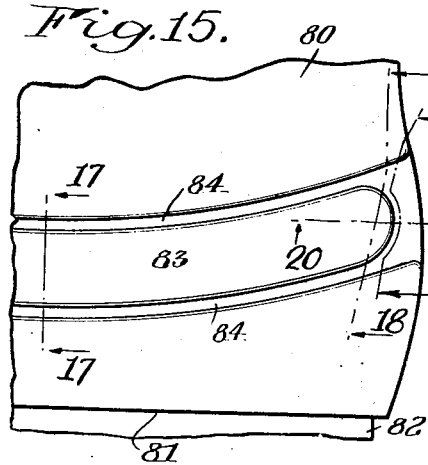
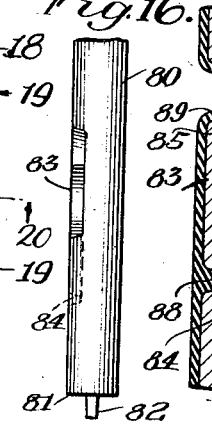
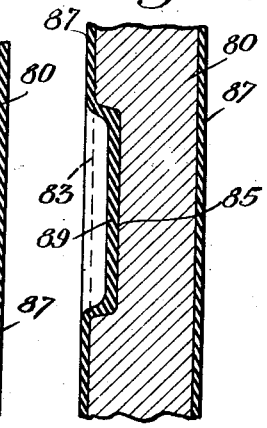
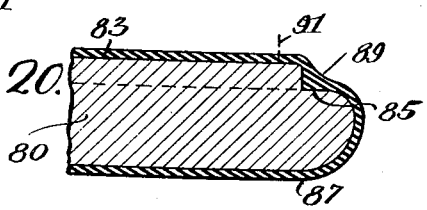
INVENTOR
Abraham N. Spánel
BY D. Clyde Jones.
his ATTORNEY Patented Nov. 30, 1937

2,100,574

UNITED STATES PATENT OFFICE 2,100,574

FORM FOR MAKING POUCHES

Abraham N. Spánel, Rochester, N. Y.

Application August 31, 1934, Serial No. 742,294

8 Claims. (Cl. 18—41)

This invention relates to forms for making latex pouches.

The main feature of the invention resides in a form for making a seamless deposited latex pouch having a locking strip integral therewith.

Another feature of the invention relates to a form for making a seamless deposited latex pouch provided with an integral locking strip, certain of the edges of said pouch being reinforced by an accretion of latex.

These and other features of the invention will appear from the detailed description and claims when taken with the drawings in which Fig. 1 is a plan view and Fig. 2 is a side view with a part broken away of a form on which a latex pouch can be deposited; Fig. 3 is a sectional view of the same taken on the line 3—3 of Fig. 1; Fig. 4 is a plan view of a form on which a modified pouch can be deposited; Fig. 5 is a fragmentary edge view of this last-mentioned form; Figs. 6 and 7 are fragmentary sectional views of the same taken respectively on the lines 6—6 and 7—7 of Fig. 4; Fig. 8 is a plan view of a form on which a still further modified pouch can be deposited; Fig. 9 is a fragmentary edge view of this form, while Fig. 10 is a sectional view thereof taken on the line 10—10 of Fig. 8 and also indicating in cross section a deposited layer of latex on the form; Fig. 11 is a plan view of a form on which another type of pouch can be deposited; Figs. 12 and 13 are respectively sectional views of this form with deposited layers of latex indicated in cross section thereon, these sections being taken respectively on the lines 12—12 and 13—13 of Fig. 11; Fig. 14 is a plan view of a still further modified type of form; Fig. 15 is an enlarged fragmentary view of the same; Fig. 16 is a fragmentary edge view of this form on the same scale as that shown in Fig. 14; Figs. 17, 18, 19 and 20 are sectional views of this form taken respectively on the lines 17—17, 18—18, 19—19 and 20—20 of Fig. 15.

One type of pouch can be made on the form 44 shown in Figs. 1, 2 and 3. This form has rounded edges 46 except for its lower portion which terminates in an abrupt edge 47 in the plane of the surfaces of the form. On one face the form is provided with a panel 45 defined by grooves 49, which panel is herein illustrated as being substantially flush with the surface of the form. The edges of the groove 49 are herein illustrated as being substantially rounded.

In making a pouch on this form a layer of latex is deposited thereon preferably by dipping the form 44 one or more times into a bath of latex or an aqueous dispersion of rubber while held by the fins 48 in a suitable supporting rack. It will be understood that in the course of the dipping operations a layer of latex which forms the pouch 5 (Fig. 3), is deposited on the form and at the same time a ridge or accretion 11 of latex will accumulate and hold by surface tension in the recess 49, while above the abrupt edge 47 a ridge or accretion 10 of latex will accumulate.

At the abrupt edge 47, there will be a line of weakness developed so that the excess portion of the deposited layer over the lower end of the form and fins 48, can be easily stripped away leaving a torn or cut edge 12. After this excess portion of the layer has been removed, the pouch can be removed from the form by withdrawing the form through the opening in the pouch. The portion of the layer enclosed by the reinforcing ridge or accretion 11 is cut away in any convenient manner, leaving the reinforcing ridge with a cut edge.

A modified type of pouch may be made on the form 50 illustrated in Figs. 4 to 7 inclusive. This form likewise has two flat surfaces connected by curved surfaces at the edge except at the lower portion of the form where the form terminates in an abrupt edge 51 terminating in the plane of mentioned surfaces. This form at its lower end is provided with a pair of fins 52 adapted to be received in a suitable rack for supporting a plurality of forms while they are being coated with latex. On one flat face of this form, there is provided a curved abrupt edge 52. This edge is defined by a portion of the lateral surfaces of the form which flares outwardly at 53 and by a surface which projects abruptly from the form thereby providing a recess 54 adjacent the abrupt edge. As best shown in Figs. 4 and 5, the abrupt edge 52 communicates at its ends with circular recesses 55 provided in the form at each edge thereof.

In making a pouch on this form, the form is coated with latex preferably by dipping it one or more times into a bath of latex while supported in an upright position on a suitable rack (not shown) by means of the fins 52. It will be understood that in the course of the dipping operations a layer of latex of any desired thickness is thus deposited on the form. The latex will tend to accumulate as buttons in the recesses 55, while at the upper side of the abrupt edge 52 the latex will accumulate as a ridge or accretion 21 somewhat similar in cross section to the cross section of one half a tear drop. However, at the abrupt edge 52, the latex will tend to flow away therefrom leaving a line of weakness in the layer but in the recess 54 the latex will accumulate as an angular ridge or accretion 23. In finishing the pouch, the latex layer is torn at the line of weakness developed by the abrupt edge 52 so that the ridges or accretions 21 and 23 terminate in torn edges. In the course of the dipping operation, the latex will also accumulate above the abrupt edge 51 to provide a reinforcing ridge or accretion similar to the ridge 10 of Fig. 3. At the abrupt edge, a line of weakness exists in the layer so that the excess portion thereof covering the lower end of the form and the fins 52 can be torn away at this line leaving a torn edge for the reinforcing accretion.

A still further modified type of pouch can be made on the form 60 illustrated in Figs. 8, 9 and 10. This form is similar in contour with forms already described, being provided with an abrupt lower edge 61 terminating in the plane of the surfaces of the form and being provided at its lower end with pins 62 for engagement with a supporting rack (not shown). On one face of the form however, there is provided a panel 63 of flattened elliptical outline projecting abruptly from its junction with the form to define a recess 64 and terminating in an abrupt edge 65. The major axis of this panel is parallel to the abrupt edge 61 of the form.

In making a pouch on the form 60, a layer of liquid latex 26 is deposited thereon and an accreted reinforcement 28 is developed above the abrupt edge 61 in the manner previously set forth. In the course of the depositing of the latex layer on the form, the latex will accumulate as a reinforcing accretion 31 in the recess 64 but a line of weakness will develop at the abrupt edge 65. After the latex layer is properly dried and/or cured, the portion within the mentioned line of weakness is torn away. The excess portion of the layer on the lower end of the form is removed as far as the abrupt edge 61 to provide the torn or cut edge 29.

A pouch 35 can be made on the form 70 of Figs. 11, 12 and 13. This form is the same as that just described except for the means provided for making the lateral opening or slit in the resulting pouch. This means comprises a sharp ridge 71 on one side of the form which ridge is surrounded by a groove 72 in the form.

In the making of a pouch on this form, a layer of liquid latex is deposited on the form as previously described. The layer will accumulate in the groove 72 as indicated at 41. However, a line of weakness will develop in the deposited layer at the sharp edge 71 so that the slit can be made in the layer by tearing along this line. The remaining operations of completing the pouch will be obvious from the foregoing description.

A pouch somewhat similar to the pouch deposited on the form illustrated in Figs. 1, 2 and 3, can be made on the form 80 illustrated in Figs. 14 to 20 inclusive. This form may be generally flat with rounded top and sides edges, while its lower portion is provided with an abrupt edge 81 or any other suitable means for defining an end opening in the pouch. The lower portion of the form below the abrupt edge 81 is provided with fins 82 or any other suitable mounting means whereby the form may be supported in a rack. One surface of the form is provided with a panel 83 of generally curved outline. This panel which may be substantially flush with the surface of the form is defined by the grooves 84 at the sides of the panel and by the depressed or cut away portions 85 and 86 at the ends of the panel which merge with said grooves. It will be understood that the portions 85 are cut away to substantially the depth of the grooves 84.

In making a pouch on this last-mentioned type of form, a layer of latex 87 is deposited on the form as previously described. The layer will accumulate by surface tension as indicated at 89 in the depressed or cutout portions 85 and 86 so that a reinforcement is provided in the deposited layer. This reinforcement comprises a ridge or accretion of latex 89 deposited at the intersection of two surfaces of the form which ridge merges with a ridge or accretion 88 deposited in the grooves cut in the form. The latex will also accumulate as a reinforcing ridge or accretion 93 above the abrupt edge 81, while a line of weakness will develop in the deposited layer at the abrupt edge 81. After the latex has been deposited on the form in the manner described and has been dried and/or cured, the excess portion of the layer on the lower end of the form is stripped or torn away as far as the abrupt edge 81. The pouch is then removed from the form by withdrawing the form through the end opening in the pouch which has been developed by stripping away the excess portion of the layer. A lateral opening is then made in the pouch by cutting, clicking, stamping or otherwise removing the portion of the layer which was deposited on the face of the panel and within the reinforcements 88 and 89 as far as the dotted lines 90 of Fig. 17 and the dotted line 91 of Fig. 20.

While several embodiments of the invention have been disclosed, it will be understood that this invention is capable of still further modifications and that this disclosure is intended to cover any variations, uses or adaptions of the invention falling within the scope of the appended claims.

What I claim is:

1. A form for making a seamless deposited latex pouch, one end of said form terminating in an abrupt edge substantially in the plane of a main surface of the form, one of the surfaces only of said form being provided with a recess remotely located with respect to said edge and having its long axis substantially parallel to said edge, the surface of the form between said recess and said edge being free of recesses.

2. A form for making a deposited seamless latex pouch, the lower portion of said form being provided with means to accumulate a reinforcement of latex, one of the surfaces of said form being provided with a panel bounded in part by a recess, said panel having its major axis generally parallel to said means.

3. A form for making a deposited seamless latex pouch, one end of said form being provided with means to accumulate a reinforcement of latex, one of the surfaces of said form being provided with a panel having a raised margin and bounded by a recess, said panel having its major axis generally parallel to said means.

4. A form for making a deposited seamless latex pouch, one end of said form being provided with means to accumulate a reinforcement of latex, one of the surfaces of said form being provided with a curved ridge spaced a substantial distance from said means, the portion of said surface between said ridge and said means being free from ridges.

5. A form for making a deposited seamless latex pouch, one end of said form being provided with an abrupt edge in substantially the plane of the surface of the form to accumulate a reinforcement of latex, one of the surfaces of said form being provided with a curved ridge, said ridge being defined by a surface projecting abruptly from said form.

6. A form for making a latex article, said form having a panel defined by a depressed area in the form merging with a groove in the form.

7. A form for making a deposited seamless latex pouch, the lower portion of said form being provided with means to accumulate a reinforcement of latex, one of the surfaces of said form being provided with a panel enclosed by a recess, said panel having its major axis generally parallel to said means, the surface of said form proper and said panel curving into said recess.

8. A form for making a deposited seamless latex pouch, the lower portion of said form terminating in an abrupt edge in substantially the plane of the main surface of the form, one face of said form being provided with a panel enclosed by a recess, the surface of said form proper and said panel curving into said recess, said panel having its major axis generally parallel to said edge.

ABRAHAM N. SPÁNEL.